(12) United States Patent
Goudemond et al.

(10) Patent No.: US 7,189,032 B2
(45) Date of Patent: Mar. 13, 2007

(54) TOOL INSERT

(76) Inventors: Iain Patrick Goudemond, 6 Haldane Crescent, Wendywood, 2144, Sandton (ZA); Nedret Can, 11A, 7th Avenue, 2193, Parktown North (ZA); James Alexander Reid, 50 Victoria Street, Kensington B, 2194, Randburg (ZA); Mehmet Serdar Ozbayraktar, 12 Frequency Turn, Radiokop Ext. 10, 1724, Roodepoort (ZA); Matthew William Cook, 17 Ballymoneen, Cappahard, Tulla Road, Ennis, Co Clare (IE); Stig Ake Andersin, Enebacken 28, S-915 32, Robertsfors (SE); Bo Christer Olofsson, Dalkarla 121, S-918 94, Bygdea (SE); Leif Anders Sandstrom, Fallfors 34, S-915 92, Robertsfors (SE); Stefan Magnus Olof Persson, Istidsgatan 53, S-906 55, Umea (SE)

( * ) Notice: Subject to any disclaimer, the term of this patent is extended or adjusted under 35 U.S.C. 154(b) by 0 days.

(21) Appl. No.: 10/504,998

(22) PCT Filed: Feb. 20, 2003

(86) PCT No.: PCT/IB03/00599

§ 371 (c)(1),
(2), (4) Date: Mar. 29, 2005

(87) PCT Pub. No.: WO03/070416

PCT Pub. Date: Aug. 28, 2003

(65) Prior Publication Data
US 2005/0166463 A1    Aug. 4, 2005

(30) Foreign Application Priority Data
Feb. 21, 2002    (ZA)    ................ 2002/1473

(51) Int. Cl.
B26O 7/00    (2006.01)
(52) U.S. Cl. .................. 407/119; 407/113; 51/307
(58) Field of Classification Search ............... 407/113, 407/119; 76/101.1, 116; 51/307, 309; 451/542; 428/337, 216, 408, 457, 697, 698, 699
See application file for complete search history.

(56) References Cited

U.S. PATENT DOCUMENTS 2,475,565 A    7/1949    Houchins (Continued)

FOREIGN PATENT DOCUMENTS

BE    1 014 066    3/2003

(Continued)

Primary Examiner—Willmon Fridie, Jr.
(74) Attorney, Agent, or Firm—Frommer Lawrence Haug LLP;; Ronald R. Santucci

(57) ABSTRACT

A method of producing a tool insert is disclosed. A body (50) of a superabrasive material having major surfaces on each of opposite sides thereof is provided. It is typically an abrasive compact disc such as a PCBN or a PCD disc, for example. An array of spaced cores (58) filled with hard metal, such as cemented carbide, for example, extends from one major surface to the opposite major surface. The body is severed from one major surface to the opposite major surface along intersecting, transverse lines (68) around the respective hard metal cores to produce the tool insert. The body may include an interlayer (56) of hard metal intermediate the opposite major surfaces, preferably the same hard metal as the cores, such that the cores are integrally formed with the interlayer.

8 Claims, 3 Drawing Sheets

U.S. PATENT DOCUMENTS

| | | |
|---|---|---|
| 3,399,442 A | 9/1968 | Jones et al. |
| 4,215,999 A | 8/1980 | Phaal |
| 5,503,509 A | 4/1996 | von Haas et al. |
| 5,676,496 A | 10/1997 | Littecke et al. |
| 6,464,434 B2 * | 10/2002 | Lynde ........................ 407/114 |
| D481,048 S * | 10/2003 | Brockett et al. ........... D15/139 |
| 6,715,967 B2 * | 4/2004 | Wiman et al. .............. 407/114 |

FOREIGN PATENT DOCUMENTS

| | | |
|---|---|---|
| EP | 0 278 703 A | 8/1988 |
| FR | 1399654 | 5/1965 |

\* cited by examiner

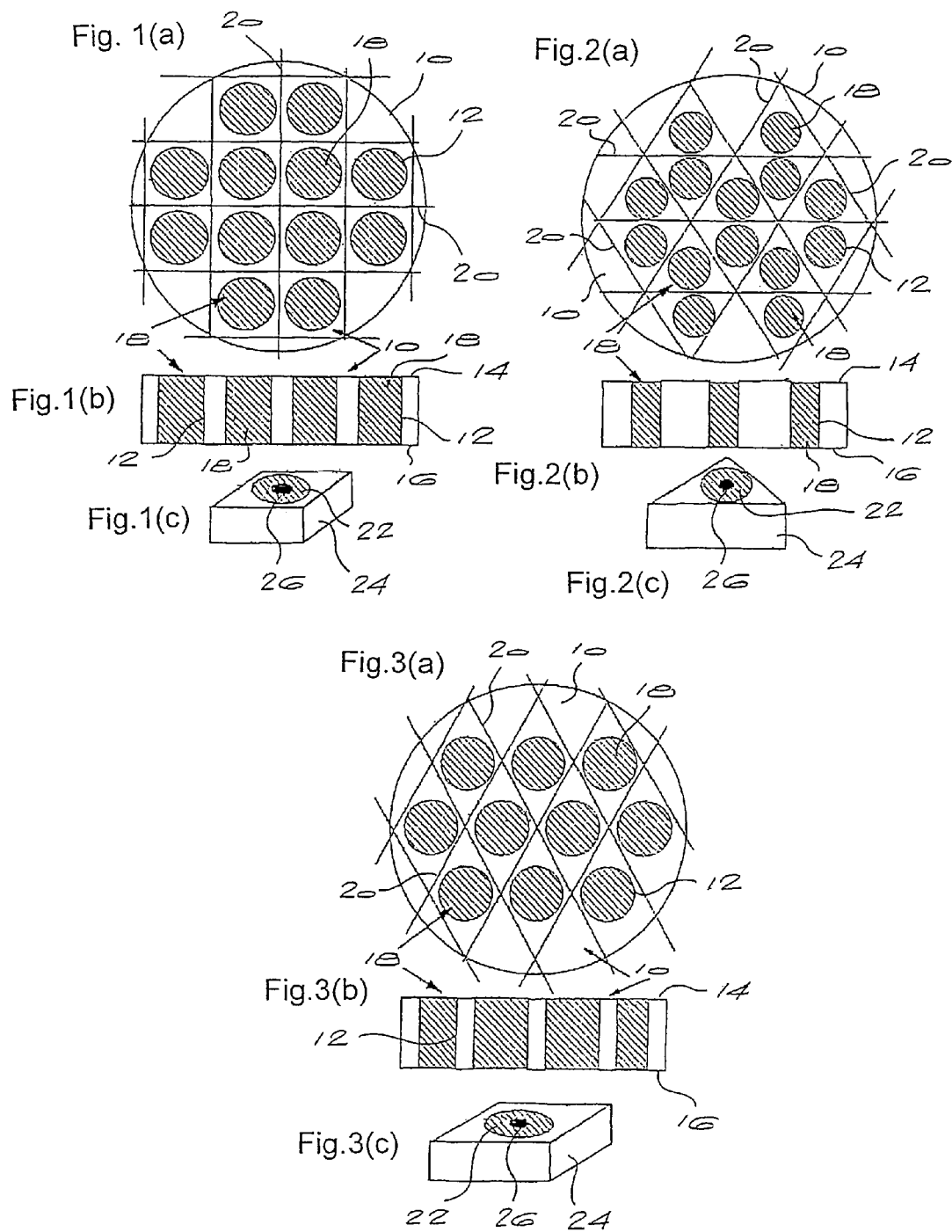

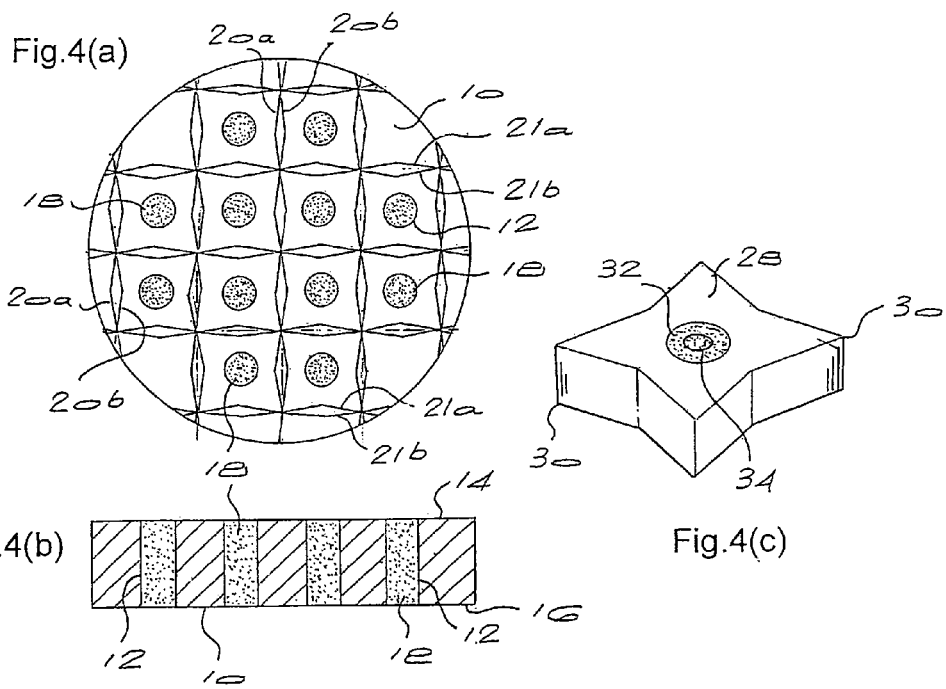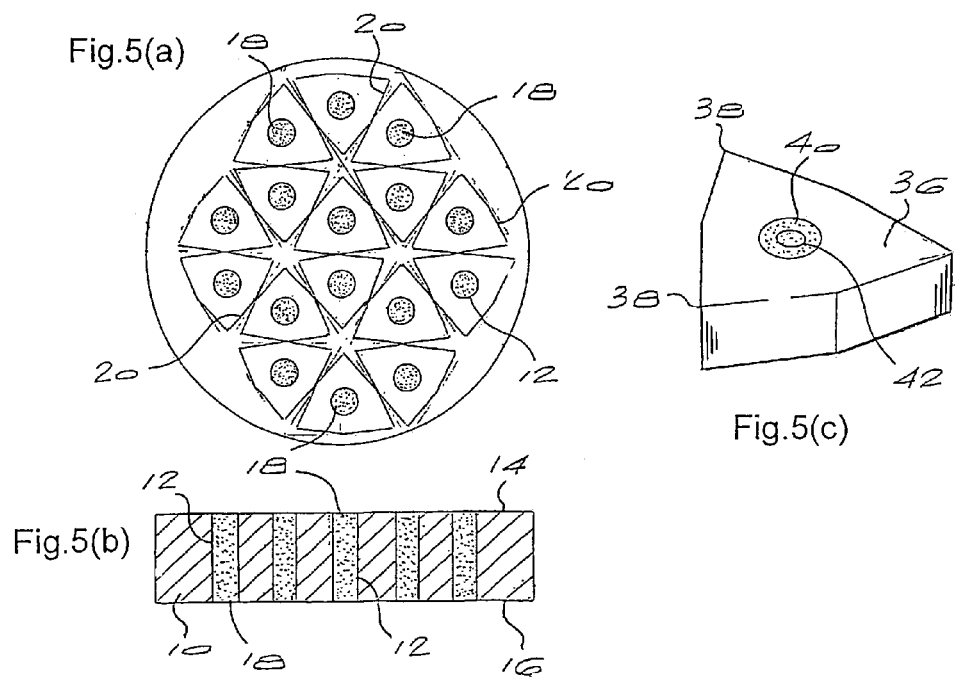

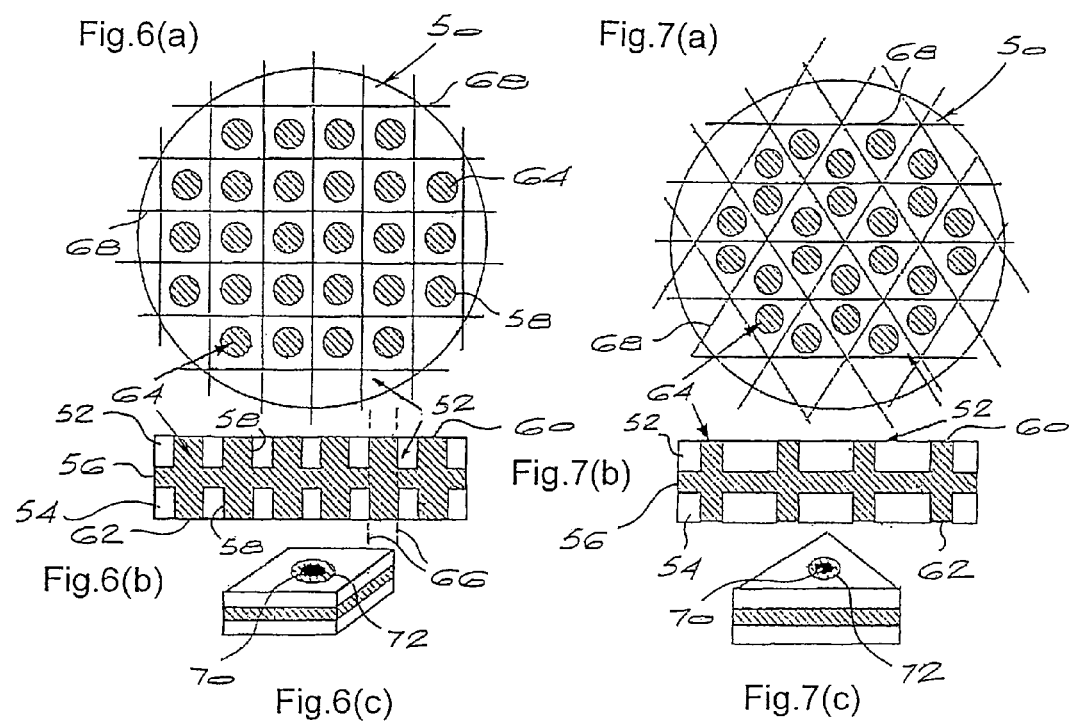
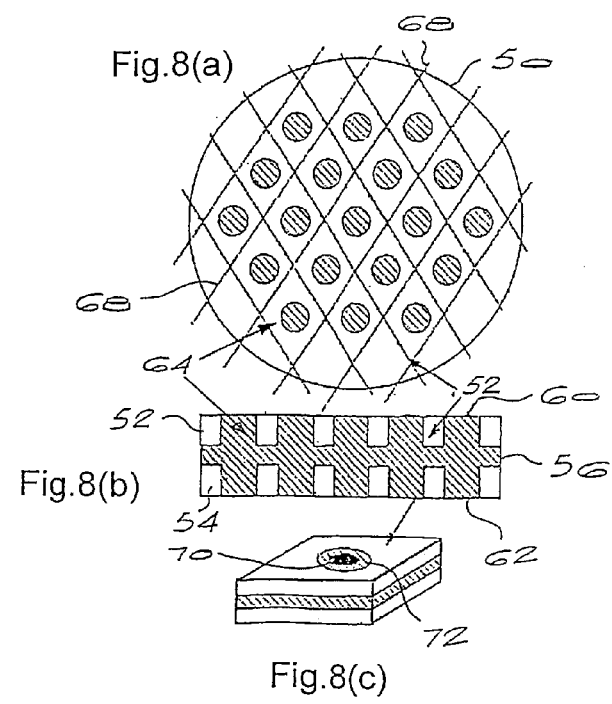

TOOL INSERT

This application is a 371 of PCT/IB03/00599 filed on Feb. 20, 2003, published on Aug. 28, 2003 under publication number WO 03/070416 A1 and claims priority benefits of South African Patent Application No. ZA 2002/1473 filed Feb. 21, 2002.

BACKGROUND OF THE INVENTION

This invention relates to a tool insert.

Abrasive compacts are polycrystalline masses of abrasive particles, generally ultra-hard abrasive particles, bonded into a hard coherent mass. Such compacts are generally bonded to a substrate, typically a cemented carbide substrate. Diamond abrasive compacts are also known as PCD and cubic boron nitride abrasive compacts are also known as PCBN.

U.S. Pat. No. 4,807,402 describes an article comprising a support mass such as a cemented carbide mass having layers of abrasive compact bonded to each of the upper and lower surfaces thereof.

EP 0 714 719 describes a tool insert comprising first and second layers of abrasive compact bonded to a central or intermediate layer of cemented carbide, ferrous metal or high melting point metal. The tool component is such that it provides a nose and flank of abrasive compact, the nose and flank providing cutting points and edges for the tool insert. Such tool inserts may be cut, for example by electrodischarge machining from an article described in U.S. Pat. No. 4,807,402.

SUMMARY OF THE INVENTION

According to the present invention, a method of producing a tool insert comprises the steps of:

(i) providing a body of a superabrasive material having major surfaces on each of opposite sides thereof, and an array of spaced cores filled with hard metal extending from one major surface to the opposite major surface; and (ii) severing the body from one major surface to the opposite major surface along intersecting, transverse lines around the respective hard metal cores to produce the tool insert The superabrasive material is preferably an abrasive compact, preferably PCD or PCBN, most preferably PCBN.

The hard metal is preferably selected from cemented carbide, a ferrous metal and a high melting point metal. The hard metal is preferably cemented carbide.

The body will preferably have a disc shape. The disc will preferably have a diameter of from about 55 mm to about 125 mm, more preferably from about 80 mm to about 100 mm, and a thickness of from about 1.6 mm to about 30 mm, more preferably from about 2 mm to about 10 mm.

The body may include an interlayer of hard metal intermediate the opposite major surfaces, preferably the same hard metal as the cores, such that the cores are integrally formed with the interlayer.

Severing may take place by known methods, e.g. laser cutting or electrodischarge machining.

According to another aspect of the invention, there is provided a polyhedral tool insert comprising a superabrasive body having major surfaces defined on opposite sides thereof, and a core of hard metal extending transversely through the body from the one major surface to the opposite major surface. The polyhedral tool insert is preferably star-shaped or in the shape of a hexagon, preferably having three cutting tips of included angle unequal to 60 degrees.

BRIEF DESCRIPTION OF THE DRAWINGS

FIG. 1a is a perspective view of an embodiment of a body for use in the method of the invention, FIG. 1b is a sectional side view of the body of FIG. 1, FIG. 1c is a perspective view of a tool insert produced by the method of the invention, FIGS. 2 to 8 illustrate further embodiments of the invention with the FIGS "a" being perspective views of bodies for use in the method, FIGS "b" being sectional side views of such bodies and FIGS "c" being perspective views of tool insert embodiments.

DESCRIPTION OF EMBODIMENTS

An embodiment of the invention will now be described with reference to FIG. 1 of the accompanying drawings. Referring first to FIG. 1a, a body 10 in the form of a superabrasive circular disc, in this case an abrasive compact disc, has an array of spaced recesses 12 formed therein. The recesses 12 extend from one major flat surface 14 to the opposite major flat surface 16. Each recess 12 is filled with cemented carbide 18, either in particulate form or as a presintered rod.

The body 10 is severed along intersecting sever lines 20 in a grid-like pattern, respective cemented carbide cores 18 being located within respective segments or blocks of the grid-like pattern. Severing takes place right through the body from one major surface 14 to the other major surface 16 to produce a square shaped tool as illustrated by FIG. 1c. This insert has a central core 22 of cemented carbide to which the abrasive compact 24 is bonded. A hole 26 may be formed through the central core 22 for mounting the tool insert in a tool.

The body 10 may be made by placing it in the reaction zone of a conventional high temperature/high pressure apparatus. Subjecting the body to suitable elevated temperature and pressure conditions, for example those at which the abrasive is crystallographically stable, results in a sintered hard and bonded body as illustrated by FIGS. 1a and 1b being produced.

The embodiment of FIG. 2 is similar to that of FIG. 1 and like parts carry like numerals. The arrangement of the recesses differs as does the sever line pattern. Triangular-shaped inserts as illustrated by FIG. 2c are produced.

The embodiment of FIG. 3 is similar to that of FIG. 1 and like parts carry like numerals. The arrangement of the recesses differs as does the pattern of sever lines and rhombohedra-shaped tool inserts as illustrated by FIG. 3c are produced.

The embodiment of FIG. 4 is similar to that of FIG. 1 and like parts carry like numerals. In this embodiment, however, the body is severed along lines 20a, 20b and 21a, 21b to produce a polyhedral tool insert having a body 28 with four cutting tips 30 with included angles less than 90 degrees and a central core 32 of cemented carbide, as shown in FIG. 4c. A hole 34 may be formed through the core 32 for mounting the tool insert in a tool.

The embodiment of FIG. 5 is similar to that of FIG. 1. The cores 18 of cemented carbide are, however, distributed in such a manner as to provide the pattern illustrated in FIG. 5a. The body 10 is cut along sever lines 20 to produce a polyhedral cutting tool insert as illustrated in FIG. 5c. The tool insert so produced has a body 36 of superabrasive, in this case abrasive compact, having three tips or corners 38 of included angle unequal to 60 degrees and a central core 40 of cemented carbide. A centrally located hole 42 may be formed through the core 40.

Referring to FIG. 6, a body 50 is formed of discs 52 and 54 that are spaced by an interlayer of cemented carbide 56. A plurality of recesses 58 are formed in each of opposite major surfaces 60, 62. These recesses 58 are filled with cemented carbide 64 which is bonded to the superabrasive and cemented carbide interlayer. As a consequence, cores of cemented carbide, as indicated in phantom lines 66, extend from the one major surface 60 to the other major surface 62. Alternatively, the hard metal interlayer or disc 56 may be prepared with studs to form the same geometry of substrate. The body 50 is severed along intersecting lines 68 in a grid-like pattern. Square tool inserts are produced as illustrated by FIG. 6*c*. A hole 70 may be formed through the centre of the core region 72.

The embodiment of FIG. 7 is similar to that of FIG. 6 and like parts carry like numerals. The embodiment differs in the arrangement of cemented carbide filled recesses 58 and the pattern of intersecting sever lines 68. A triangular shaped insert as shown in FIG. 7*c* is produced.

The embodiment of FIG. 8 is similar to that of FIG. 6 and like parts carry like numerals. The arrangement of recesses 58 and the pattern of sever lines 68 is such as to produce a rhombohedra shaped insert, as shown in FIG. 8*c*.

The embodiments of FIGS. 4 and 5 could also be produced from a body as described with reference to FIG. 6, with appropriate modifications to the arrangement of cemented carbide cores 66 and sever lines 68.

In the embodiments described above, the severing of the bodies may take place by methods known in the art, for example, laser cutting or electrodischarge machining.

What is claimed is:

1. A method of producing a tool insert comprising the steps of:
   (i) providing a body of a superabrasive material having major surfaces on each of opposite sides thereof, and an array of spaced cores filled with hard metal extending from one major surface to the opposite major surface; and
   (ii) severing the body from one major surface to the opposite major surface along intersecting, transverse lines around the respective hard metal cores to produce the toll insert; and
   wherein the body further comprises an interlayer of hard metal, the hard metal cores being integrally formed with the interlayer.

2. A method according to claim 1, wherein the superabrasive material is an abrasive compact.

3. A method according to claim 2, wherein the abrasive compact is PCD or PCBN.

4. A method according to claim 1, wherein the hard metal is selected from the group comprising a cemented carbide, a ferrous metal and a high melting point metal.

5. A method according to claim 1, wherein the body has a disc shape.

6. A method according to claim 5, wherein the diameter of the disc is from about 55 mm to about 125 mm and the thickness thereof is from about 1.6 mm to about 30 mm.

7. A method according to claim 6, wherein diameter of the disc is from about 80 mm to about 100 mm and the thickness thereof is from about 2 mm to about 10 mm.

8. A method according to claim 1, wherein a severing pattern is provided for severing the body to produce a multiple of tool inserts having a desired shape.

* * * * *